May 7, 1929.  R. LEZIUS  1,711,686
CULINARY MOLD
Filed July 21, 1927  2 Sheets-Sheet 1
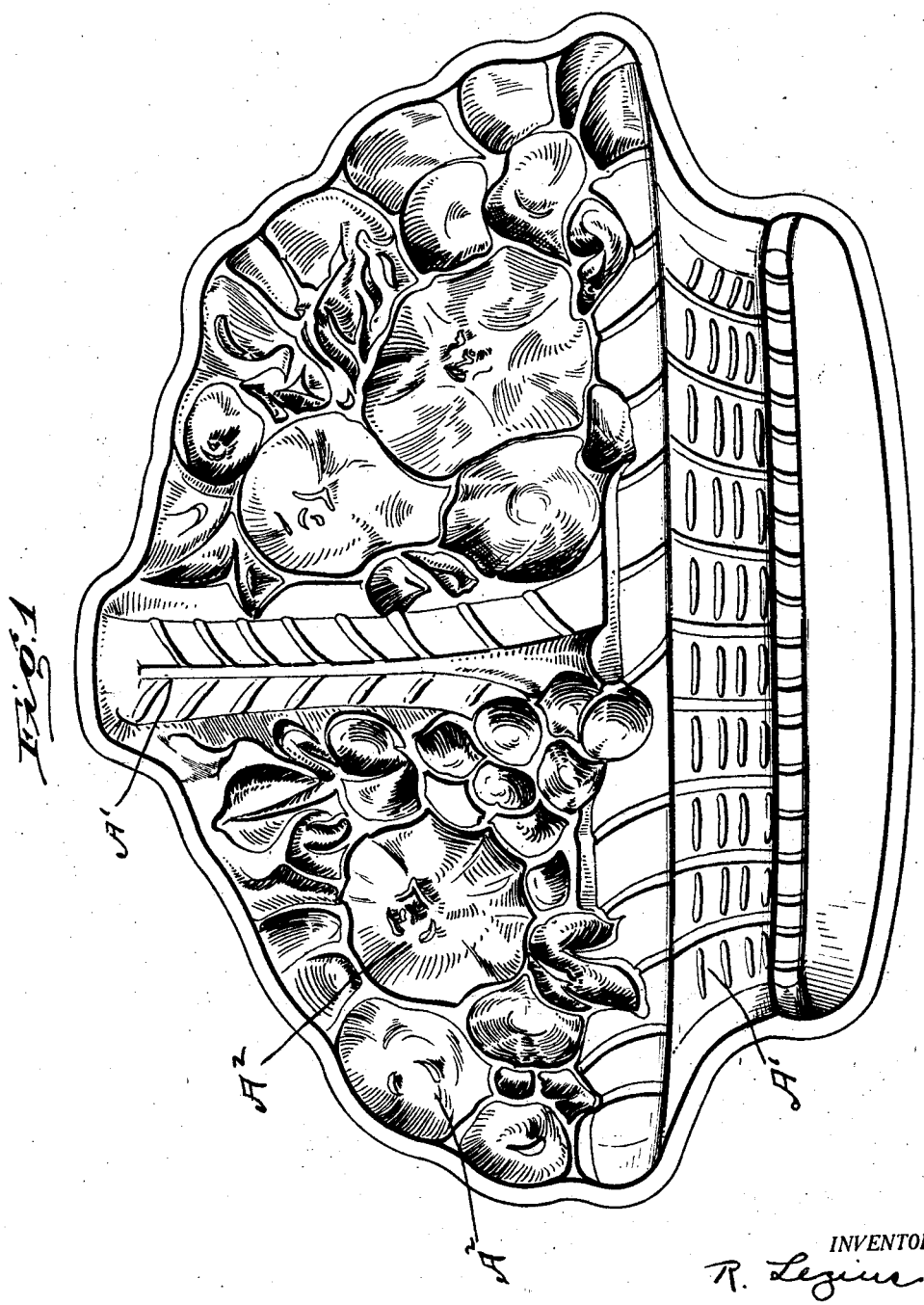

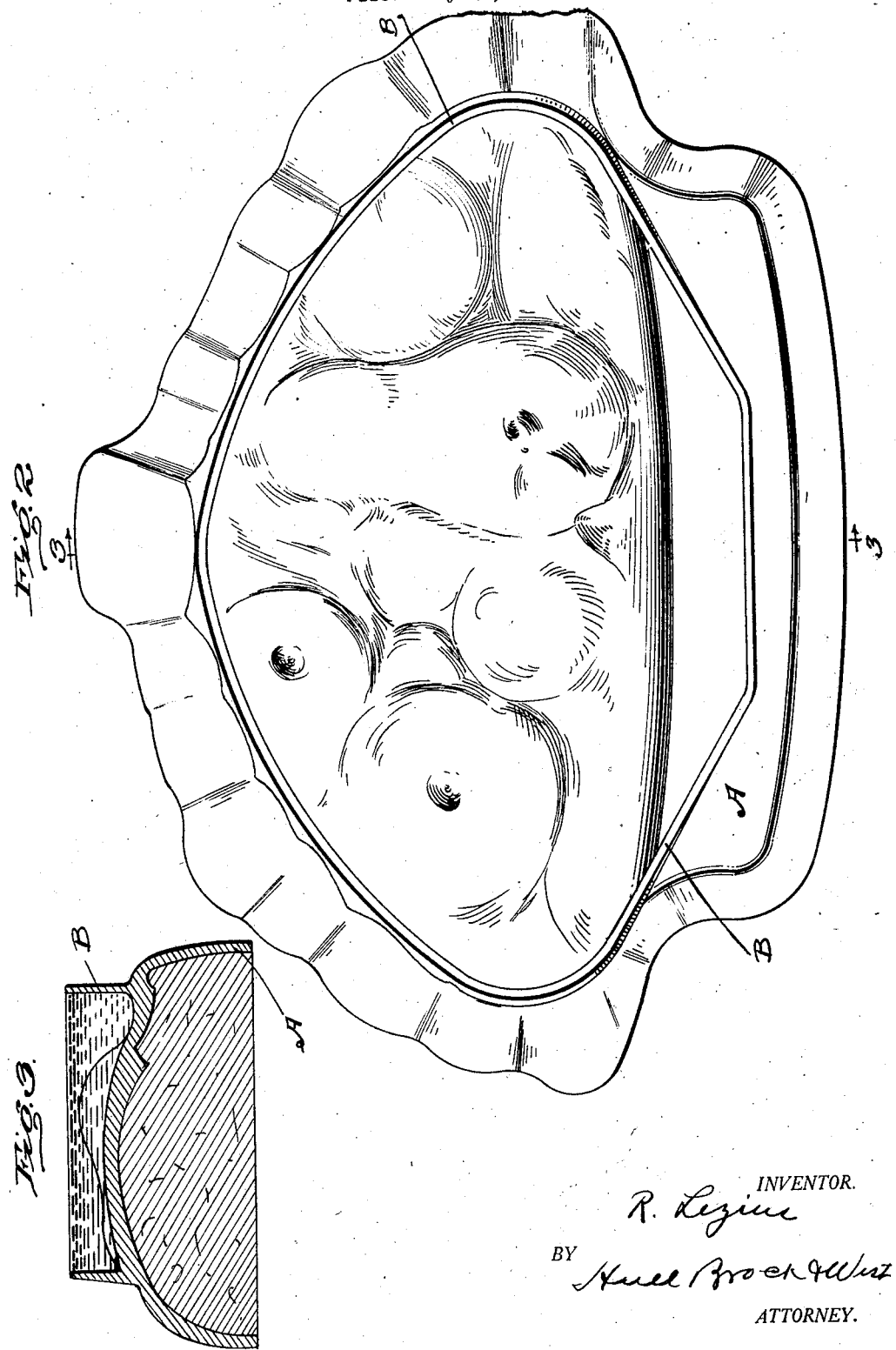

Patented May 7, 1929.

1,711,686

UNITED STATES PATENT OFFICE.

ROSALIE LEZIUS, OF EUCLID, OHIO.

CULINARY MOLD.

Application filed July 21, 1927. Serial No. 207,493.

This invention is a novel construction of culinary mold, particularly adapted for molding jellies and similar compounds.

The object of the invention is to provide a mold from which the molded article can be easily removed, as it frequently happens, with the molds now in use, that great difculty is had in removing the jelley or molded article.

The invention therefore consists in providing a supporting flange or wall upon the bottom of the mold, which serves the double purpose of providing a firm support for the mold, at one time, and a retaining wall or flange, to form a liquid receiving receptacle when the mold is inverted and in which hot water can be placed to heat the bottom of the mold sufficiently to make it easy to remove the molded compound.

The invention consists also in certain details hereinafter fully described and pointed out in the claim.

In the drawings forming a part of this specification:—

Figure 1 is a face view of the mold;

Figure 2 is a bottom view of the same; and

Figure 3 is a sectional view.

The mold A can be made of any suitable metal, and shaped to produce a molded article in simulation of any desired article. In the present instance I have shown a mold to simulate a basket A' and fruit A².

On the bottom of the mold I provide a flange or wall B, which provides a flat support for the mold, and maintains the same in its upright proper position.

This flange or wall B is continuous and is of such height that a receptacle is provided when the mold is inverted and into which hot water can be placed to heat up the bottom of the mold.

This moderate amount of heat will be sufficient to loosen the molded article from the mold, and insure said molded article coming out smooth and unbroken.

It will thus be seen that I provide a novel construction of culinary mold, capable of carrying out all of the hereinbefore recited objects.

What I claim is:—

As a new article of manufacture, a concavo-convex metallic mold, the concave side having the molding surface, the convex side having a continuous flange, said flange serving to maintain the mold in upright receiving position, and providing a liquid retaining means when the mold is inverted.

In testimony whereof, I hereunto affix my signature.

ROSALIE LEZIUS.